United States Patent [19]

Eisenhart et al.

[11] Patent Number: 5,137,571
[45] Date of Patent: Aug. 11, 1992

[54] METHOD FOR IMPROVING THICKENERS FOR AQUEOUS SYSTEMS

[75] Inventors: Eric K. Eisenhart, Doylestown; Richard F. Merritt, Fort Washington; Eric A. Johnson, Lansdale, all of Pa.

[73] Assignee: Rohm and Haas Company, Philadelphia, Pa.

[21] Appl. No.: 533,148

[22] Filed: Jun. 5, 1990

[51] Int. Cl.$^5$ .................. C08K 5/15; C08L 1/28; C08L 3/02; C09D 7/12
[52] U.S. Cl. .................. 106/217; 106/176; 106/213; 106/214; 524/27; 524/48
[58] Field of Search .................. 106/176, 162, 217, 213, 106/214; 524/27, 48

[56] References Cited

U.S. PATENT DOCUMENTS

| | | | |
|---|---|---|---|
| 3,854,969 | 12/1974 | Zwahlen | 106/176 |
| 4,079,028 | 3/1978 | Emmons et al. | 260/29.6 |
| 4,155,892 | 5/1979 | Emmons et al. | 260/29.2 |
| 4,180,491 | 12/1979 | Kim et al. | 260/29.2 |
| 4,396,933 | 8/1983 | Brandt et al. | 106/194 |
| 4,426,485 | 1/1984 | Hoy et al. | 524/591 |
| 4,496,708 | 1/1985 | Dehm et al. | 528/76 |
| 4,499,233 | 2/1985 | Tetenbaum et al. | 524/591 |
| 4,661,378 | 4/1987 | McGovern | 106/285 |
| 4,760,368 | 7/1988 | Sugihawa et al. | 106/196 |
| 4,772,329 | 9/1988 | Lühmann et al. | 106/195 |
| 4,773,935 | 9/1988 | Uda et al. | 106/169 |
| 4,944,803 | 7/1990 | Kraus | 106/195 |

FOREIGN PATENT DOCUMENTS 3828031 8/1988 Fed. Rep. of Germany.
6049022 8/1983 Japan.
2189245 10/1987 United Kingdom.

OTHER PUBLICATIONS

CA 108(10):81809u, Iwao et al., 1987.
Perry, *Chemical Engineers Handbook*, 5th Ed., McGraw-Hill, N.Y. 1973, pp. 21-23-21-11.
Cyclodextrins Increase Surface Tension and Critical Micelle Concentration of Detergent Solutions, W. Saenger & A. Muller-Fahrnow, Agnew Chem. In t. Ed. Egl. 27, (1988), No. 3 pp. 393-394.

*Primary Examiner*—Theodore Morris
*Assistant Examiner*—David M. Brunsman

[57] ABSTRACT

A method is provided for improving thickeners used in aqueous system. The improvement is directed to the elimination of organic cosolvents which are conventionally added to aqueous solutions of certain hydrophobic thickeners. This method involves the reversible complexation of cyclodextrin compounds with hydrophobic moieties on the thickener molecule to suppress the viscosity of the aqueous solution containing the thickener so that such the solution can be easily handled. This is followed by decomplexing the cyclodextrin from the thickener to permit the thickener to perform its intended function.

11 Claims, No Drawings

METHOD FOR IMPROVING THICKENERS FOR AQUEOUS SYSTEMS

FIELD OF THE INVENTION

This invention relates to thickners used in aqueous systems, such as for example in aqueous latex paint formulations, and more particularly to aqueous solutions of certain hydrophobic thickners which require the presence of organic cosolvents. More particularly, the invention is directed to the used of cyclodextrin compounds for reversibly complexing with hydrophobic moieties on the thickener molecule resulting in the suppression of the viscosity of aqueous solutions containing such thickeners.

BACKGROUND OF THE INVENTION

Aqueous systems, such as for example coatings containing emulsion polymer binders, typically employ thickeners to obtain the desired degree of viscosity needed for the proper formulation and application of the aqueous system. One general type of thickener used in aqueous systems is referred to in the art by the term "associative". Associative thickeners are so called because the mechanism by which they thicken is believed to involve hydrophobic associations between the hydrophobic species in the thickener molecules themselves and/or with other hydrophobic surfaces. A number of different types of associative thickeners are known including, but not limited to polyurethanes, hydrophobically modified alkali soluble emulsions, hydrophobically modified hydroxyethyl cellulose or other natural products, and hydrophobically modified polyacrylamides.

Certain of these associative thickeners, such as for example the polyurethane thickeners, are sold as aqueous solutions containing organic cosolvents. The function of the organic cosolvent, such as for example propylene glycol, is to suppress the viscosity of the aqueous solution containing the associative thickener to allow for ease in its handling before its use as a thickener. While these organic cosolvents perform their intended function, they possess potential environmental, safety and health disadvantages. Viscosity suppression may also be accomplished by the use of surfactants. While this presents no specific health/environmental hazard, it does degrade formulation performance.

It would therefore be advantageous if one could develop more environmentally acceptable and safe materials which could be used in place of these organic cosolvents or surfactants.

DESCRIPTION OF THE PRIOR ART

There are many references which disclose various hydrophobic compounds which act as associative thickeners. The associative thickeners are formulated with organic cosolvents or surfactants for use in thickening aqueous latex systems.

U.S. Pat. Nos. 4,155,892 and 4,079,028 are directed to polyurethane thickeners, characterized by at least three hydrophobic groups interconnected by hydrophilic polyether groups, formulated with organic cosolvents.

U.S. Pat. No. 4,426,485 is directed to water-soluble thermoplastic, organic polymers having a weight average molecular weight of at least about 10,000 comprising hydrophobic segments each containing at least one monovalent hydrophobic group covalently bonded to the polymer, wherein the polymer has an amount of hydrophobic bunching comprising at least two monovalent hydrophobic groups per hydrophobic segment, sufficient to provide for enhanced thickening of aqueous solutions containing the polymer.

U.S. Pat. No. 4,496,708 is directed to water-soluble polyurethane comb polymer thickeners.

U.S. Pat. No. 4,499,233 discloses polyurethane thickeners in solution form in a water compatible solvent.

U.S. Pat. No. 4,180,491 also discloses urethane associative thickeners which use a non-aqueous, inert organic diluent.

Japanese Patent Disclosure No. 60-49022 describes using ethanol or surfactants with water for the dissolution of urethane associative thickeners.

None of these references, however, disclose or suggest a suitable method for providing the thickener in an aqueous solution at a handleable viscosity without the use of organic cosolvents.

It is therefore an object of the present invention to provide a method for improving associative thickeners by eliminating the need for organic cosolvents.

SUMMARY OF THE INVENTION

A method for improving associative thickeners by the addition of one or more cyclodextrin compounds to aqueous solutions containing associative thickeners is provided. The cyclodextrin compound suppresses the viscosity of aqueous solutions containing associative thickeners and eliminates the need for organic cosolvents. In addition the viscosity suppressing function of the cyclodextrin compounds is readily reversed, as needed, by the addition of a compound having an affinity for the cyclodextrin, such as for example a surfactant, thereby providing an effective associative thickener for aqueous systems. In other embodiments of the invention the cyclodextrins have been found to: improve the ease of incorporating hydrophobically modified, associative thickners, having marginal solubility in water, into aqueous systems; to reduce the viscosity drop of associative thickener containing formulations upon the addition of colorants or surfactants to the formulation; to improve the efficiency of the associative thickener itself, thus reducing the thickener required to reach a given paint viscosity; to reduce foaming in a latex paint, and to reduce the color development problems caused by surfactants in some formulations.

DETAILED DESCRIPTION OF THE INVENTION

Cyclodextrin compounds are cyclically closed oligosaccharides with 6, 7 or 8 alpha-D-glucoses per macrocycle. The six glucose ring cyclodextrin compound is referred to as an alpha-cyclodextrin; the 7 glucose ring cyclodextrin compound is referred to as a beta-cyclodextrin, and the 8 glucose ring cyclodextrin compound is referred to as the gammacyclodextrin. Cyclodextrins are produced from starch of any selected plant variety, such as corn, potato, waxy maize, and the like which may be modified or unmodified starch derived from cereal or tuber origin and the amylose or amylopectin fractions thereof. The selected starch in the form of an aqueous slurry, at concentrations up to about 35% by weight solids, is usually liquefied, as by gelatination or treatment with a liquefying enzyme such as bacterial alpha-amylase enzyme, and then subjected to treatment with a transglycosylate enzyme to form the cyclodextrins. The amount of individual alpha, beta and gamma cyclodextrins will vary depending on the selected starch, selected transglycolase enzyme and processing conditions. Precipitation and separation of the individual cyclodextrins is described in the literature using solvent systems, inclusion compounds such as trichloroethylene and non-solvent systems utilizing selected ion exchange resins. Each of the cyclodextrins as well as mixtures thereof are commercially available materials. Betacyclodextrin is the most widely used form and is known for use in the production of pharamaceuticals and foods.

The ability of cyclodextrins to form inclusion complexes with organic compounds and thereby increase the water solubility of the organic compound is known. In *Cyclodexitrins Increases Surface Tension and Critical Micelle Concentrations of Detergent Solutions* by W. Saenger and A. Muller-Fahrnow, Agnew. Chem. Int. Ed. Egl. 27 (1988) No. 3 at pages 393-394, the authors discuss the ability of the central hydrophobic cavity of the cyclodextrin compounds to accommodate the hydrophobic, aliphatic part of a detergent molecule having a diameter of about 5 Angstroms. Studies with such detergents showed that the cyclodextrins were capable of increasing the surface tension of the detergent molecule and shifting the critical micelle concentration of the detergent to a higher value, thus making the detergent more soluble in water. This was suggested as being beneficial in cases where micelles need to be destroyed or where surface tension needs to be increased, as for example to avoid foaming.

UK Patent application 2,189,245 A entitled *Producing Modified Cyclodextrins*, published on Oct. 21, 1987, and assigned to American Maize-Products Company discloses a method for increasing the water solubility of cyclodextrins. This method involves modification with alkylene carbonates and preferably ethylene carbonate to form hydroxyethyl ethers on the ring structure.

Applicants have found that because cyclodextrin compounds absorb onto or form complexes with hydrophobic species, they can be absorbed onto the hydrophobic moieties of associative thickeners. The absorption of cyclodextrin compounds onto the hydrophobic moieties of associative thickeners causes a suppression of the viscosity of an aqueous solution containing the associative thickener. It has been found that cyclodextrin compounds can be readily desorbed or decomplexed from the associative thickener by the addition of another material which has an affinity for the cyclodextrin.

Applicants have found that not only can the alpha, beta and gamma cyclodextrins be used effectively as transient viscosity suppressing agents for hydrophobic associative thickeners, but that modified cyclodextrins, such as for example those cyclodextrins produced by the process described in UK Patent application 2,189,245 A, which are more soluble in water than the unmodified cyclodextrin compounds can also be employed in this manner. In fact applicants have found it preferable to utilize hydroxyethyl- or hydroxypropyl- cyclodextrins having a higher degree of water solubility than the unmodified cyclodextrins for use with aqueous solutions containing high concentrations of associative thickener.

The least water soluble of the unmodified cyclodextrins is beta-cyclodextrin. The water solubility limit of beta cyclodextrin is about 2 grams per 100 grams of water. This limits the concentration of beta cyclodextrin which can be employed to suppress the viscosity of an aqueous solution containing an associative thickener. Since the viscosity of an aqueous solution containing an associative thickener increases with the concentration of the associative thickener solids, the solubility limit of the cyclodextrin determines the maximum amount of cyclodextrin which can be added to the solution without resulting in the formation of undesirable solids. If the maximum concentration of a viscosity suppressing additive needed to reduce the viscosity of an aqueous solution containing an associative thickener to a handleable viscosity, such as for example a viscosity of about 2,000 cps, exceeds the solubility limit of the additive in water, then the additive is not effective as a viscosity suppressant additive. In other words, the effectiveness of a cyclodextrin as a viscosity suppressing additive is a function of the solubility limit of the cyclodextrin and the solids content of the associative thickener in the aqueous solution. The higher the solids content of the associative thickener the higher the viscosity of the aqueous solution containing it will be, and likewise the higher the concentration of the cyclodextrin which will be needed to be added to suppress the viscosity down to a handleable viscosity. This relationship between the solubility limit of the cyclodextrin and the viscosity of an aqueous solution containing an associative thickener is critical in the selection of an effective cyclodextrin for use as a viscosity suppressing additive. As described in more detail below, this relationship favors the selection of unmodified cyclodextrins other than beta cyclodextrin, and modified cyclodextrin additives having increased water solubility in cases where the aqueous solutions contains high concentrations of associative thickener solids.

Applicants have found that the use of beta-cyclodextrin and its ethoxylate and propoxlate derivatives are useful in latex paint formulation for achieving a variety of effects, such as for example: to permit the preparation and supply of a low viscosity, high solids solution of the thickener without the use of viscosity suppressing solvent; improving the ease of incorporating hydrophobically modified, associative thickeners, having marginal solubility in water, into aqueous systems; to reduce the viscosity drop of associative thickener containing formulations upon the addition of colorants or surfactants to the formulation; to improve the efficiency of the associative thickener itself, thus reducing the thickener required to reach a given paint viscosity; to reduce foaming in a paint, with or without an associative thickener, which is especially desirable when the paint is to be applied by a roller; and to reduce the color development problems caused by surfactants in some formulations.

In aqueous solutions containing low concentrations of associative thickener solids, for example on the order of about 3 percent by weight, we have found that the unmodified cyclodextrins, including beta cyclodextrin, are effective viscosity suppressing additives, while in aqueous solutions containing high concentrations of associative thickener solids, for example on the order of greater than about 10 percent by weight, we have found the modified cyclodextrins, having increased water solubility on the order of about 50 grams per 100 grams water, are preferred.

As illustrated in the examples which follow we have found that handleable viscosities can be achieved with polyurethane type associative thickeners at low solids concentrations from about 3% to about 12% by weight using from about 0.5% to about 2% of a beta-cyclodextrin having a water solubility of 2 grams per 100 grams water. Modified cyclodextrins, such as for example the hydroxyethyl- or hydroxypropyl-cyclodextrins, can also be effectively used with low solids associative thickeners. With high solids associative thickeners containing on the order of about 20% by weight of a urethane associative thickener, we found that only the modified cyclodextrins were effective viscosity suppressing additives since the concentrations which were required to be added exceeded the water solubility limits of the unmodified cyclodextrins. In the case of such high solids urethane associative thickeners we found that it was necessary to employ about 10% of the modified cyclodextrins to achieve handleable viscosities.

The ability to decomplex the cyclodextrin additive from the hydrophobic associative thickener is just as important as the ability of the cyclodextrin to absorb or complex with the associative thickener in the first instance. It is critical for the thickener to perform its intended viscosity increasing function in the aqueous system to which the associative thickener solution is added. Thus the cyclodextrin must decomplex or desorb from the hydrophobic moieties on the associative thickener molecule. We have found that cyclodextrins are readily desorbed or decomplexed from hydrophobic associative thickeners simply by the addition of a material which has an affinity for the cyclodextrin. In this regard we have found that conventional surface active agents commonly employed in aqueous coating systems, such as for example anionic surfactants like sodium lauryl sulfate and nonionic surfactants such as for example Igepal CO-660 (a 10 mole ethoxylate of nonyl phenol), and cationic surfactants, may be used to decomplex or desorb the cyclodextrin. Other water soluble organic solvents such as for example ethanol and Texanol TM may also be employed for this purpose but are not preferred. We have found that it is preferred to utilize about one mole of the decomplexing agent per mole of the cyclodextrin added to the associative thickner solution in order to achieve complete desorption or decomplexation. Both the complexation and decomplexation mechanisms are easily achieved by the addition of the reactants with mixing. No special purification or separation steps are required. In our experiments with certain latex paint formulations we have unexpectedly found that it is not necessary to add additional surfactant to cause this decomplexation process to occur; the formulation surfactants already present in the paint have been found to be sufficient. When the cyclodextrin-modified thickners are added to the paint formulation at equal levels, based on the thickner component in the formulation, those modified with cyclodextrin have been shown to possess a slightly better efficiency (higher equilibrated Krebs-Stormer viscosity) than those containing the unmodified thickner. Formulation surfactants in the paint tend to suppress the development of associative thickening. Therefore, the formation of the surfactant-cyclodextrin complex, which occurs as the thickener is activated, reduce the effective surfactant concentration in the formulation, thus increasing the equilibrated viscosity. Addition of further surfactants over a wide range of hydrophilic-hydrophobic balances (HLBs) and from 1 to 5 mole equivalents of surfactant to cyclodextrin causes a decrease in viscosity. Those thickeners modified with cyclodextrins, especially the propoxylate modified cyclodextrins, are less affected by the surfactant addition.

The viscosity stabilizing effect of the cyclodextrins can be further utilized by post adding the cyclodextrins to the associatively thickened formulation. As demonstrated by illustrative example 9 presented hereinafter, the viscosity loss which occurred upon the addition of predispersed colorant to the formulation was reduced by increasing levels of cyclodextrins. The data presented in example 9, clearly demonstrates the innate viscosity instability of this type of associative thickener can be reduced by the post-addition of cyclodextrins thus making the thickener less formulation sensitive.

One of the limitations in associative thickener chemistry is the latitude one has on the size of the hydrophobe relative to the hydrophilic backbone of the molecule. As the hydrophobe become larger, it become more associative and thus more efficient. However, a practical limitation is reached when the thickener no longer can incorporate into the aqueous phase of the paint. In current associative thickener technology, the incorporation of the thickener in many formulations is undesirably slow. We have demonstrated that we can improve the incorporation of the thickener. In the illustrative examples presented hereinafter we have demonstrated that the time required to incorporate the cyclodextrin modified compared with the unmodified thickener. To do this, the thickener was added to the formulation and the time required for the thickener to dissolve in the formulation was measured under similar stirring conditions for each of the thickeners. The results demonstrated that the cyclodextrins modified thickeners were incorporated in one fourth of the time required by the unmodified thickener.

The surfactant complexing effect of the cyclodextrins are also of benefit to the formulator for other properties than rheological modification.

Typically when formulating tinted paints, the composition of the formulation, specifically the surfactants, must be modified to maintain the stability of the colorant dispersion while not adversely affecting the dispersion of the other components. In some formulations, the paint components, such as the latex vehicle, bring an incompatible surfactant into the formulation. To correct for this, additional surfactants are added to the formulation to compatibilize the system. While effective in compatibilizing the system, these surfactants can contribute adverse water sensitivity and foaming characteristics to the formulation. In the illustrative examples, presented hereinafter, we have demonstrated that cyclodextrins are useful in improving the compatibility of a colorant without adding additional surfactants.

The surfactant complexing effect of the cyclodextrins are also of benefit to the formulator for other properties. Because of the high surfactant loading required to prepare many latex paint vehicles, foaming in the formulated paint must be combatted. Current technologies for foam reduction are limited in efficacy by the formulation and application problems that they can cause. The use of ethoxylated cyclodextrins, and presumably cyclodextrin itself or other derivatives, is able to reduce the foaming tendency of two formulations without the development of any adverse phenomena such as surface defects.

The following examples illustrate the operation of the invention using conventional associative thickener. These examples are intended merely to illustrate the invention and are not intended nor should they be interpreted as limiting the scope of the invention since modifications to the process illustrated are considered to be obvious to one of ordinary skill in the art.

EXAMPLE 1

Low Solids

This example demonstrated the effectiveness of beta-cyclodextrin to suppress the viscosity of an aqueous solution of a polyurethane associative thickener (Rohm and Hass Company, QR-708) at a low solids content of 3% by weight (3 grams solid QR-708 in 97 grams water). The associative thickener aqueous solution was prepared as follows: differing quantities of Beta-cyclodextrin (American Maize Company) was then added to aliquots of the associative thickener solution (3 g solid QR-708 in 97 g $H_2O$) with mixing in a jar on a shaker for 4 hours and allowed to stand overnight. The viscosity of the solutions were measured using a Brookfield viscometer (spindle number 4) at 30 rpm. Table 1 shows the results of the addition of the beta-cyclodextrin to the associative thickener solutions.

TABLE 1

| Sample | beta-cyclodextrin grams | viscosity cps |
|---|---|---|
| 1 | 0 | 210 |
| 2 | 0.0009 | 210 |
| 3 | 0.0117 | 192 |
| 4 | 0.0512 | 196 |
| 5 | 0.1010 | 204 |
| 6 | 0.1996 | 177 |
| 7 | 0.3030 | 108 |
| 8 | 0.4016 | 35 |
| 9 | 0.5056 | 14 |
| 10 | 1.0077 | 7 |

The results show that the viscosity of the associative thickener solution steadily fell as the amount of cyclodextrin was increased.

EXAMPLE 2

Restoration of Viscosity: Anionic and Nonionic Surfactants

Next we determined whether it was possible to restore the viscosity of aqueous solutions containing 3% QR-708 (3 grams solid QR-708 in 97 grams water) and 1 gram beta-cyclodextrin to the original viscosity level of the 3% QR-708 solution by adding sodium lauryl sulfate ("SLS", 28%). We measured the viscosity of the solution as in Example 1 as the amount of SLS was added. Table 2 shows the results.

TABLE 2

| Sample | SLS grams | viscosity, cps |
|---|---|---|
| 11 | 0.01 | 10 |
| 12 | 0.09 | 10 |
| 13 | 0.47 | 48 |
| 14 | 0.89 | 191 |

The original viscosity of the solution was recovered upon the addition of 0.25 grams of SLS solids (0.89 grams of 28% SLS), which is equivalent to 1 mole of SLS per mole of beta-cyclodextrin added.

This experiment was repeated using a nonionic surfactant, Igepal CO-660. The results are shown in Table 3.

TABLE 3

| Sample | Igepal TM CO-660, grams | viscosity, cps |
|---|---|---|
| 15 | .29 | 50 |

TABLE 3-continued

| Sample | Igepal TM CO-660, grams | viscosity, cps |
|---|---|---|
| 16 | .58 | 725 |

This shows that the original viscosity was recovered upon the addition of 0.58 grams of the nonionic surfactant, which is equivalent to 1 mole per mole of beta-cyclodextrin.

EXAMPLE 3

Restoration of Viscosity: Cationic Surfactants and Organic Solvents

To a solution of 3 g of a 100% solids, QR-708 (3 grams solid QR-708 in 97 grams water) and 1 g of beta-cyclodextrin (from American Maize) in 97 g of DI water was added the following quantities of a cationic surfactant 18/25 (Ethoquad is the registered trade mark of Akzo Chemicals Inc. and is chemically methyl-polyoxyethylene (15)octadecyl ammonium chloride). Table 4 show results.

TABLE 4

| Sample | Cationic Surfactant 18/25 | viscosity, cps | Spindle # |
|---|---|---|---|
| 17 Comparative | 0 g | 5 | 1 |
| 18 | .23 g | 11 | 1 |
| 19 | .45 g | 123 | 1 |
| 20 | .68 g | 484 | 3 |
| 21 | .91 g | 1,060 | 4 |

Viscosities were determined on a Brookfield viscometer at 30 rpm using the spindle number indicated above. This shows that the original visocisity was recovered upon the addition of 0.91 g. of the cationic surfactant.

Further, the ability of organic solvent for recovering original viscosity was also examined using Texanol TM (2,2,4-trimethyl-3-hydroxypentyl acetate) and propylene glycol. The results are shown in Table 5.

TABLE 5

| Sample | Texanol TM, grams | Propylene glycol, grams | viscosity, cps |
|---|---|---|---|
| 22 | 0.10 | — | 18 |
| 23 | 0.19 | — | 299 |
| 24 | — | .03 | 7 |
| 25 | — | 0.07 | 6 |
| 26 | — | 0.14 | 6 |
| 27 | — | 0.21 | 8 |

The results showed that the organic solvents were less effective than either of the surfactants for recovering original viscosity, and while Texanol was useful, propylene glycol was not.

EXAMPLE 4

High Solids

This example demonstrates the effectiveness of beta cyclodextrin as a viscosity suppressing additive for high solids urethane thickener solutions. A series of samples containing either 0 grams, 1.5 grams or 2 grams beta-cyclodextrin and varying concentrations of the urethane associative thickener (total solution weight is 100 g) were prepared in accordance with example 1. Table 6 shows the viscosity of each of the solutions.

TABLE 6

| Sample | Beta-cyclodextrin grams | QR-708 % solids | Viscosity cps |
|---|---|---|---|
| 28 Comparative | 0 | 3 | 1,180 |
| 29 Comparative | 0 | 5 | 3,500 |
| 30 Comparative | 0 | 7.5 | 44,700 |
| 31 Comparative | 0 | 10 | 154,800 |
| 32 Comparative | 0 | 12.5 | 353,600 |
| 33 Comparative | 0 | 15 | 454,000 |
| 34 Comparative | 0 | 17.5 | 665,000 |
| 35 Comparative | 0 | 20 | 870,000 |
| 36 | 1.5 | 3 | 60 |
| 37 | 1.5 | 5 | 70 |
| 38 | 1.5 | 7.5 | 4,750 |
| 39 | 1.5 | 10 | 4,750 |
| 40 | 1.5 | 12.5 | 20,150 |
| 41 | 1.5 | 15 | 40,000 |
| 42 | 1.5 | 17.5 | 214,000 |
| 43 | 1.5 | 20 | 478,000 |
| 44 | 2.0 | 3 | 7 |
| 45 | 2.0 | 5 | 12 |
| 46 | 2.0 | 7.5 | 35 |
| 47 | 2.0 | 10 | 1,050 |
| 48 | 2.0 | 12.5 | 15,650 |
| 49 | 2.0 | 15 | 27,800 |
| 50 | 2.0 | 17.5 | 86,900 |
| 51 | 2.0 | 20 | 240,800 |

The results show that a viscosity of about 2000 cps can be achieved at around 10–12% QR-708 solids using 2 grams of the beta-cyclodextrin, while this viscosity can be achieved at 8% solids using 1.5 grams beta-cyclodextrin.

EXAMPLE 5

Alpha- and Gamma Cyclodextrins

This example demonstrates the effectiveness of alpha cyclodextrin and gamma cyclodextrin as viscosity suppressing additives for urethane associative thickeners.

To solutions containing 3 grams QR-708 (100% solids) were added the materials shown in Tables 7 and 8 respectively. The samples were then capped and agitated for three hours and then put in a water bath at 25 degrees C. for 16 hours. The viscosity of each sample was then measured using a Brookfield viscometer at 30 rpm using the spindle # indicated.

TABLE 7

Alpha-Cyclodextrin

| Sample | Alpha-cyclodextrin grams | Deionized Water grams | Viscosity cps | Spindle # |
|---|---|---|---|---|
| 52 Comparative | 0 | 97.00 | 1,540 | 4 |
| 53 | 0.10 | 96.90 | 900 | 4 |
| 54 | 0.25 | 96.75 | 172 | 3 |
| 55 | 0.50 | 96.50 | 14 | 2 |
| 56 | 1.00 | 96.00 | 4 | 1 |

TABLE 8

Gamma Cyclodextrin

| Sample | Gamma-cyclodextrin grams | Deionized Water | Viscosity cps | Spindle # |
|---|---|---|---|---|
| 57 Comparative | 0 | 97.00 | 1,540 | 4 |
| 58 | 0.10 | 96.90 | 1,340 | 4 |
| 59 | 0.25 | 96.75 | 1,096 | 3 |
| 60 | 1.00 | 96.00 | 114 | 2 |

EXAMPLE 6

Cyclodextrin Derivatives

This example illustrates the use of modified cyclodextrins as viscosity suppressing additives for both low solids and high solids urethane associative thickeners. The cyclodextrins used were ethoxylated (EO-CD) and propoxylated beta-cyclodextrins(PO-CD) obtained from American Maize Company. The solutions were prepared and the viscosities were determined using the procedure of example 1 (total solution weight was 100 g). The results are shown in Table 9.

TABLE 9

Modified Cyclodextrins

| Sample | Cyclodextrin Type, grams | | QR-708 % solid | Viscosity cps |
|---|---|---|---|---|
| 61 Comparative | 0 | EO-CD | 3 | 1,364 |
| 62 | .1 | | 3 | 1,436 |
| 63 | .2 | | 3 | 1,184 |
| 64 | .5 | | 3 | 584 |
| 65 | 1.0 | | 3 | 6 |
| 66 Comparative | 0 | EO-CD | 20 | 313,600 |
| 67 | 2 | | 20 | 298,400 |
| 68 | 4 | | 20 | 181,600 |
| 69 | 5 | | 20 | 135,200 |
| 70 | 6 | | 20 | 36,400 |
| 71 | 7 | | 20 | 20,400 |
| 72 | 8 | | 20 | 2,984 |
| 73 | 10 | | 20 | 684 |
| 74 | 2 | PO-CD | 20 | 528,000 |
| 75 | 4 | | 20 | 133,200 |
| 76 | 6 | | 20 | 9,600 |
| 77 | 8 | | 20 | 760 |
| 78 | 10 | | 20 | 460 |

EXAMPLE 7

Other Associative Thickeners

This example demonstrates the utility of the cyclodextrin additives as viscosity suppressants for aqueous solutions containing other types of associative thickeners.

The thickeners used in this experiment were: Acrysol ™ TT-935 (Rohm and Haas Company), a hydrophobically modified alkali soluble emulsion thickener, and a hydrophobically modified hydroxyethyl cellulose thickener (Natrosol Plus ™ from Aqualon). A unmodified (non-hydrophobic) hydroxyethyl cellulose thickener was also evaluated. Each of these thickeners were formulated separately in aqueous solutions at various concentrations and the beta-cyclodextrin additive was added as described in example 1. The viscosities of the solutions were measured as in example 1 and the results are shown in Table 10.

TABLE 10

OTHER ASSOCIATIVE THICKENERS

| Sample | Beta-cyclodextrin grams | Associative thickener grams and type | Viscosity cps |
|---|---|---|---|
| 79 Comparative | 0 | 2.0 solid TT-935* | 411 |
| 80 | 0.25 | " | 146 |
| 81 | 0.5 | " | 99 |
| 82 | 0.75 | " | 33 |
| 83 | 1.0 | " | 21 |
| 84 Comparative | 0 | 3 Nat. Plus** | 4,240 |
| 85 | 0.25 | " | 1,380 |
| 86 | 0.50 | " | 400 |
| 87 | 0.75 | " | 221 |
| 88 | 1.0 | " | 165 |
| 89 Comparative | 0 | 3 HEC*** | 3,520 |
| 90 | 0.25 | " | 4,680 |

TABLE 10-continued

| | OTHER ASSOCIATIVE THICKENERS | | |
|---|---|---|---|
| Sample | Beta-cyclodextrin grams | Associative thickener grams and type | Viscosity cps |
| 91 | 0.50 | " | 5,120 |
| 92 | 0.75 | " | 4,720 |
| 93 | 1.0 | " | 4,880 |

*(1% solution) in .8 g of 50 wt % NaOH and 197.2 g H2O
**(1.5% solution) in 197 g H2O
***(1.5% solution) in 197 g H2O The results show that beta-cyclodextrin can reduce the viscosity of these two hydrophobically modified thickeners, TT-935 and Natrosol Plus, TM but has no effect on the viscosity for the non-hydrophobic thickener, hydroxyethyl cellulose (HEC).

EXAMPLE 8

Latex Paint

This example demonstrates the use of the cyclodextrin additives in aqueous latex paint formulations containing associative thickeners. The composition of the latex paint formulation used in this example is shown below in Table 11.

TABLE 11

| Latex Paint Formulation #1 | |
|---|---|
| Material | Pounds |
| Propylene glycol | 70.00 |
| Tamol TM SG-1 dispersant (35%) | 12.00 |
| Foamaster TM VL antifoaming agent | 1.00 |
| Water | 45.00 |
| Titanium dioxide Pure TM -R-900 | 210.00 |
| China Clay | 88.00 |
| Water | 116.70 |
| Texanol TM | 11.40 |
| AC-64 acrylic binder | 378.00 |
| Foamaster TM VL | 3.00 |
| Water | 42.00 |
| Thickener plus water | 92.80 |

PVC = 29.81, Volume solids = 34.86

TABLE 12

Thickening Efficiency in Latex Paint
Surfactant Addition Effects

| | Thickener type | | | |
|---|---|---|---|---|
| | HEUR Control | BCD | E-BCD | P-BCD |
| Thickener Demand (dry lbs/100 gal) (based upon thickener component) | 2.27 | 2.27 | 2.27 | 2.27 |
| Viscosity | | | | |
| KU equil | 102 | 110 | 111 | 105 |
| ICI | 0.8 | 0.8 | 0.8 | 0.8 |
| Surfactant Addition | Viscosity change (KU) | | | |
| Triton TM X-45 | | | | |
| 1 mole equiv. | −5 | −4 | −5 | −3 |
| 2 | −11 | −2 | −1 | −2 |
| 5 | −17 | −6 | −7 | −3 |
| Triton TM X-100 | | | | |
| 1 mole equiv. | −9 | −6 | −4 | −6 |
| 2 | −27 | −6 | −6 | −5 |
| 5 | −35 | −14 | −13 | −10 |
| Triton TM X-405 | | | | |
| 1 mole equiv. | −19 | −11 | −8 | −5 |
| 2 | −34 | −15 | −12 | −2 |
| 5 | −39 | −32 | −26 | −8 |

The cyclodextrin modified thickeners were added to the paint formulation at equal levels based on the thickener component in the formulation. Those modified with cyclodextrins(BCD is beta cyclodextrin, E-BCD is ethoxylated beta cyclodextrin and P-BCD is propoxylated betacyclodextrin) demonstrated better efficiency (higher equilibrated Krebs-Stormer viscosity) than the unmodified thickener (control, QR-708 is a hydrophobically modified ethoxylated urethane rheology modifier). Addition of further surfactants (ethoxylated octyl phenols-Triton TM X-45(5 EO units), X-100(9.5 EO units) and X-405(40 EO units) )over a wide range of HLBs and from 1 to 5 mole equivalents of surfactant to cyclodextrin containing formulations caused decreases in viscosity.

EXAMPLE 9

Latex Paint: Post addition of cyclodextrins

This example demonstrated that the viscosity stabilizing effect of the cyclodextrin can be further utilized by the post addition of cyclodextrins to an associatively thickened paint formulation.

The latex paint used in this example had the composition shown in Table 13.

TABLE 13

| Latex Paint Formulation #2 | |
|---|---|
| Material | Amount, pounds |
| Water | 106.7 |
| Tamol TM 731 (25%) dispersant | 11.5 |
| Propylene glycol | 25.0 |
| Patcote TM 801 (defoamer) | 2.0 |
| Titanium dioxide-Pure R-900 | 250.0 |
| Optiwhite TM (China clay) | 100.0 |
| Attagel TM 50 (Attapulgite clay) | 5.0 |
| Polymeric Binder AC-64 | 350.00 |
| Texanol TM | 10.60 |
| Patcote TM 801 | 4.00 |
| Thickener plus water | 234.70 |

PVC = 36.8, Volume solids = 35.86

The latex paint formulation #2 was thickened to a viscosity of 110 Krebs Units with a hydrophobically modified ethoxylated urethane rheology modifier. To the thickened paint samples was post-added an equivalent of from 0 to 10 pounds of cyclodextrin per 100 gallons of the paint. After this each paint was tinted to an equivalent of 2 fluid ounces of predispersed lampblack colorant per gallon of paint. After stirring, the Krebs-Stormer viscosity of each paint sample was again measured. The viscosity difference between the initial viscosity and the viscosity after tinting was used as a measure of stability. Table 14 presents the results of this evaluation.

TABLE 14

| Viscosity Stability Upon Colorant Addition | |
|---|---|
| Additive Level (lbs/100 gal) | Viscosity Change (KU) |
| 0 lbs beta-CD | −34 |
| 1 | −27 |
| 3 | −12 |
| 5 | −3 |
| 7 | +4 |
| 10 | +4 |
| 0 lbs beta-CD ethoxylate | −34 |
| 1 | −25 |
| 3 | −14 |
| 5 | −3 |
| 7 | +4 |
| 10 | +8 |
| 0 lbs beta-CD propoxylate | −34 |
| 1 | −25 |
| 3 | −8 |
| 5 | +1 |

TABLE 14-continued

Viscosity Stability Upon Colorant Addition

| Additive Level (lbs/100 gal) | Viscosity Change (KU) |
| --- | --- |
| 7 | +4 |
| 10 | +5 |

EXAMPLE 10

Time to Incorporate Associative Thickener

This example demonstrates the ability of the cyclodextrins to reduce the time required for the incorporation of associative thickeners in a latex paint formulation. The associative thickener was added to latex paint formulation #1, and stirred. The time required for the thickener to dissolve in the paint was measured. The results are shown in Table 15.

TABLE 15

Rate of Thickener Incorporation

| Thickener | Time to incorporate (min.) |
| --- | --- |
| HEUR (hydrophobically modified ethoxylated urethane rheology modifier-control) | 120 |
| Beta-cyclodextrin | 29 |
| Ethoxylated-beta cyclodextrin | 27 |
| Propoxylated-beta-cyclodextrin | 29 |

EXAMPLE 11

Compatibility of Colorant

A tint base formulation (Paint formulation #3: Table 16) was prepared with and without additional colorant stabilizing surfactants. To those paints formulated without the surfactants we added an equivalent of 0 to 10 lbs of ethoxylated cyclodextrin per 100 gallons of paint. After equilibration, the paints were cast on a Leneta TM WB sealed white chart using a 3 mil Bird TM applicator. The paint films were allowed to dry at 77° F. and 50% relative humidity for 4 days. After drying was complete, approximately 10 grams of the same paint was cast on 3" band of each chart by brush and brushing was continued to dryness to provide significant shear to the paint being applied. After an overnight dry at 77° F. and 50% relative humidity, the color acceptance of the paints were evaluated by measuring the difference in Y-reflectance of the brush vs. Bird cast films using a spherically integrating reflectometer. If the colorant and other components of the paints are properly dispersed, there would be no shear dependent change in the Y-reflectance of the film. While perfect color acceptance was not achieved, it is clear from the data that the use of an equivalent of 5 lbs of the ethoxylated cyclodextrins per 100 gallons yielded an improvement equal to the either or both of the surfactants listed in the formulation. While degree of color acceptance problem in this example may be barely significant to human perception, the trend for improvement up to the 5 lbs level was clear when so measured.

TABLE 16

Paint Formulation #3

| Material | Amount, pounds |
| --- | --- |
| The following were charged to the tank: | |
| Tamol TM 850 dispersant (30%) | 9.0 |
| Water | 2.0 |
| Propylene glycol | 60.0 |
| Antifoamer | 0.5 |
| The following were added with low speed mixing: | |
| High gloss rutile titanium dioxide | 225.0 |
| Barytes (barium sulfate) | 40.0 |

The above was then ground in a high-speed mill (Cowles 3800–4500 feet per minute) for 10–15 minutes, and was then let down with the following at low speed mixing

| | |
| --- | --- |
| Propylene glycol | 95.5 |
| Polymeric Binder Rhoplex TM AC-490 (46.5%) | 526.0 |
| Acrysol TM G-110 Acrylic thickener | 10.3 |
| Mineral spirits | 1.0 |
| Water | 68.7 |
| Butyl Cellosolve | 24.5 |
| Triton TM N-57 nonyl phenol ethoxylate | either 0.0 or 4.0 |
| Triton TM X-207 alkylaryl polyether alcohol | either 0.0 or 4.0 |
| Tint: predispersed red iron oxide | 4 ounces/100 gallons |

PVC = 23.3%, Volume solids = 33.0%, gloss (60 degrees) = 40–50

TABLE 17

Color Acceptance Modification with beta-Cyclodextrin Ethoxylate

| Added Surfactant for Color Acceptance | Ethoxylated CD (lbs/100 gal) | Y-Reflectance Difference (upon shear) |
| --- | --- | --- |
| 4 lbs Triton TM N-57 and 4 lbs Triton TM X-207 | 0 | 0.51 |
| | 1 | 0.43 |
| | 3 | 0.52 |
| | 5 | 0.56 |
| | 10 | 0.49 |
| 4 lbs Triton TM N-57 | 0 | 0.33 |
| | 1 | 0.32 |
| | 3 | 0.40 |
| | 5 | 0.35 |
| | 10 | 0.50 |
| 4 lbs Triton TM X-207 | 0 | 0.36 |
| | 1 | 0.36 |
| | 5 | 0.51 |
| | 10 | 0.63 |
| No added surfactant | 0 | 0.49 |
| | 1 | 0.42 |
| | 3 | 0.36 |
| | 5 | 0.32 |
| | 10 | 0.58 |

EXAMPLE 12

Reduction in Foaming in Latex Paint

This example demonstrates the use of cyclodextrins to reduce foaming in latex paints. They latex paint formulation used in this example is shown in Table 18 as Paint Formulation #4.

TABLE 18

Paint Formulation #4

| Material | Pounds |
| --- | --- |
| Methyl Carbitol | 39.0 |
| Acrylic latex, Rhoplex HG-74 (42.5%) | 598.5 |
| Texanol TM | 37.0 |
| Dowicil TM 75 ⎤ premix | 1.0 |
| Water ⎦ | 5.0 |
| Ammonium hydroxide (28%) | 2.0 |
| Water | 40.0 |

TABLE 18-continued

Paint Formulation #4

| Material | Pounds |
|---|---|
| Defoamer, Foamaster TM AP | 4.2 |
| Carbon Black, Harshaw TM W-7012 | 25.0 |
| Acrylic Thickener, ⎤ | 22.8 |
| Acrysol TM RM-5 (30%)   premix | 32.2 |
| Water ⎥ | |
| Ammonium hydroxide (28%) ⎦ | 2.2 |
| Water | 46.9 |

To test this formulation, the equivalent to 0 to 10 lbs of ethoxylated betacyclodextrin per 100 gallons of paint was added to the paint. After equilibration overnight, the paints were applied to a seal Leneta TM 12-H-BW chart using a 3", ¾" nap synthetic fiber roller. The paint films were allowed to dry under ambient conditions. Surface defects in the film were rated by determining the frequency of defect on a 2 cm square area. The results in Table 19 show that at levels of 5 lbs/100 gallons of the ethoxylated cyclodextrin and higher, foaming defects were eliminated.

TABLE 19

Surface Defects - Roller Foam Test
Addition of beta-cyclodextrin ethoxylated

| Additive Level CD-ethoxylate (lbs/100 gal) | Foaming (Surface Defects/2 cm sq.) |
|---|---|
| 0 | 5 |
| 1 | 2 |
| 3 | 1 |
| 5 | 0 |
| 10 | 0 |

What is claimed is:

1. A method for eliminating the need for organic solvents for hydrophobic thickeners useful for thickening aqueous systems containing a water-insoluble polymer comprising:
   (a) admixing a cyclodextrin-containing compound having hydrophobic groups with a hydrophobic thickener selected from the group consisting of hydrophobically modified polyethoxylated urethanes, hydrophobically modified alkali soluble emulsions, hydrophobically modified hydroxyethyl cellulose, and hydrophobically modified polycrylamides where said cyclodextrin-containing compound is admixed in an amount effective to complex the hydrophobic groups of said cyclodextrin-containing compound with the hydrophobic groups of said hydrophobic thickener;
   (b) adding said complexed admixture to said aqueous system containing said water-insoluble polymer; and
   (c) adding to said aqueous system containing said complexed admixture and said water-insoluble polymer, a compound having an affinity for the cyclodextrin-containing compound wherein said compound is an anionic, nonionic or cationic surfactant and where said compound is added in an amount effective to decomplex the hydrophobic groups of said cyclodextrin-containing compound from the hydrophobic groups of said hydrophobic thickener.

2. The method of claim 1 wherein said cyclodextrin-containing compound is selected from the group consisting of alpha, beta and gamma cyclodextrin and ethoxylated and propoxylated cyclodextrins.

3. The method of claim 1 wherein said surfactant is added to said aqueous system at a concentration of about one mole per mole of said cyclodextrin-containing compound.

4. The method of claim 1 wherein said cyclodextrin-containing compound is admixed with said hydrophobic thickener at a level less than the water solubility of said cyclodextrin-containing compound.

5. A method for reversibly reducing the viscosity of an aqueous solution containing a hydrophobic thickener selected from the group consisting of hydrophobically modified polyethoxylated urethanes, hydrophobically modified alkali soluble emulsions, hydrophobically modified hydroxyethyl cellulose, and hydrophobically modified polyacrylamides comprising reducing the viscosity of said aqueous solution by adding to said solution a cyclodextrin-containing compound in an amount effective to complex the hydrophobic groups of said hydrophobic thickener with the hydrophobic groups of said cyclodextrin-containing compound and increasing the viscosity of said aqueous solution containing said cyclodextrin-containing compound by adding to said solution at least one mole, per mole of said cyclodextrin-containing compound, of a compound having an affinity for said cyclodextrin-containing compound wherein said compound having an affinity for said cyclodextrin-containing compound is an anionic, nonionic or cationic surfactant.

6. A method of using a cyclodextrin-containing compound for reducing the viscosity of aqueous solutions containing a water-insoluble polymer and hydrophobic thickeners selected from the group consisting of hydrophobically modified polyethoxylated urethanes, hydrophobically modified alkali soluble emulsions, hydrophobically modified hydroxyethyl cellulose, and hydrophobically modified polyacrylamides comprising adding to said solution said cyclodextrin-containing compound in an amount effective to complex the hydrophobic groups of said hydrophobic thickener with the hydrophobic groups of said cyclodextrin-containing compound.

7. A method of improving the incorporation of a hydrophobic thickener selected from the group consisting of hydrophobically modified polyethoxylated urethanes, hydrophobically modified alkali soluble emulsions, hydrophobically modified hydroxyethyl cellulose, and hydrophobically modified polyacrylamides into an aqueous formulation containing a water-insoluble polymer comprising adding to said formulation a cyclodextrin-containing compound in an amount effective to complex the hydrophobic groups of said hydrophobic thickener with the hydrophobic groups of said cyclodextrin-containing compound.

8. A method for reducing the loss of viscosity of an aqueous system containing water-insoluble polymer and hydrophobic thickener selected from the group consisting of hydrophobically modified polyethoxylated urethanes, hydrophobically modified alkali soluble emulsions, hydrophobically modified hydroxyethyl cellulose, and hydrophobically modified polyacrylamides comprising adding to said aqueous systems a cyclodextrin-containing compound in an amount effective to complex the hydrophobic groups of said hydrophobic thickener with the hydrophobic groups of said cyclodextrin-containing compound.

9. A method for improving the thickening efficiency of hydrophobic thickeners selected from the group consisting of hydrophobically modified polyethoxylated urethanes, hydrophobically modified alkali soluble emulsions, hydrophobically modified hydroxyethyl cellulose, and hydrophobically modified polyacrylamides in aqueous systems containing water-insoluble polymer and hydrophobic thickeners comprising adding to said system a cyclodextrin-containing compound in an amount effective to complex the hydrophobic groups of said hydrophobic thickener with the hydrophobic groups of said cyclodextrin-containing compound.

10. A method for reducing the color development problems associated with surfactants in a latex paint containing a dispersion of water-insoluble polymer and a hydrophobic thickener selected from the group consisting of hydrophobically modified polyethoxylated urethanes, hydrophobically modified alkali soluble emulsions, hydrophobically modified hydroxyethyl cellulose, and hydrophobically modified polyacrylamides in water comprising adding a cyclodextrin-containing compound in an amount effective to complex the hydrophobic groups of said thickener with the hydrophobic groups of said cyclodextrin-containing compound.

11. A method for reducing foaming in a latex paint containing a dispersion of water-insoluble polymer and a hydrophobic thickener selected from the group consisting of hydrophobically modified polyethoxylated urethanes, hydrophobically modified alkali soluble emulsions, hydrophobically modified hydroxyethyl cellulose, and hydrophobically modified polyacrylamides in water comprising adding a cyclodextrin-containing compound to said latex paint at a level of at least 5 pounds of said cyclodextrin-containing compound per 100 gallons of said latex paint.

* * * * *